(12) United States Patent
Maufer et al.

(10) Patent No.: US 7,643,443 B2
(45) Date of Patent: Jan. 5, 2010

(54) SYSTEMS AND METHODS FOR AUTONOMOUSLY AND DYNAMICALLY OPTIMIZING TRANSMISSION POWER IN A WIRELESS NETWORK

(75) Inventors: Thomas A. Maufer, Menlo Park, CA (US); Paul J. Sidenblad, Cupertino, CA (US)

(73) Assignee: NVIDIA Corporation, San Jose, CA (US)

( * ) Notice: Subject to any disclaimer, the term of this patent is extended or adjusted under 35 U.S.C. 154(b) by 414 days.

(21) Appl. No.: 11/002,568

(22) Filed: Dec. 1, 2004

(65) Prior Publication Data

US 2005/0147074 A1  Jul. 7, 2005

Related U.S. Application Data

(63) Continuation-in-part of application No. 10/953,222, filed on Sep. 28, 2004.

(60) Provisional application No. 60/508,361, filed on Oct. 3, 2003.

(51) Int. Cl.
*H04W 4/00* (2009.01)
*H04B 7/00* (2006.01)
*H04B 7/185* (2006.01)

(52) U.S. Cl. .................................. 370/328; 455/522

(58) Field of Classification Search .............. 370/329, 370/318, 332; 455/423, 13.4, 522, 67.11, 455/69, 574, 115.3, 127.1–127.2
See application file for complete search history.

(56) References Cited

U.S. PATENT DOCUMENTS

| | | | |
|---|---|---|---|
| 6,370,359 B1 * | 4/2002 | Ue et al. | 455/69 |
| 2001/0024964 A1 * | 9/2001 | Wang et al. | 455/562 |
| 2003/0003905 A1 | 1/2003 | Shvodian | |
| 2003/0039217 A1 | 2/2003 | Seo et al. | |
| 2004/0047425 A1 | 3/2004 | Itoh | |
| 2005/0003827 A1 * | 1/2005 | Whelan | 455/454 |

FOREIGN PATENT DOCUMENTS

| | | | |
|---|---|---|---|
| EP | 1355433 A | 10/2003 | |
| EP | 1357681 A | 10/2003 | |

\* cited by examiner

*Primary Examiner*—Patrick N Edouard
*Assistant Examiner*—Michael T Thier
(74) *Attorney, Agent, or Firm*—Patterson & Sheridan, LLP

(57) ABSTRACT

A method for autonomously and dynamically optimizing transmission power of an endpoint in a wireless network includes the step of monitoring the signal quality associated with data transfers between an access point in the wireless network and the endpoint at a first transmission power and a first transmission speed. The method also includes the steps of determining whether the signal quality is acceptable and adjusting one of the first transmission power or the first transmission speed based on whether the signal quality is acceptable.

18 Claims, 3 Drawing Sheets

SYSTEMS AND METHODS FOR AUTONOMOUSLY AND DYNAMICALLY OPTIMIZING TRANSMISSION POWER IN A WIRELESS NETWORK

CROSS-REFERENCE TO RELATED APPLICATION

This application is a continuation-in-part of the nonprovisional patent application titled, "Systems and Methods for Autonomously and Dynamically Optimizing Transmission Power in a Wireless Network," filed Sep. 28, 2004 and having application Ser. No. 10/953,222. The nonprovisional application relates to, and claims the priority benefit of, U.S. Provisional Patent Application No. 60/508,361 titled, "System and Method for Autonomously and Dynamically Optimizing Transmission Power in a Wireless Network," filed Oct. 3, 2003. The subject matter of the nonprovisional and provisional patent applications is hereby incorporated by reference.

BACKGROUND OF THE INVENTION

1. Field of the Invention

This invention generally relates to wireless networks and more specifically to systems and methods for autonomously and dynamically optimizing transmission power in a wireless network.

2. Description of the Background Art

In wireless networks, the transmission power level of the endpoint is one of the biggest drains on endpoint battery power. Some current systems attempt to tailor transmission power through a process sometimes referred to as "ranging," whereby an exchange occurs at the beginning of a connection to determine the attenuation between peer devices. The transmission power is then adjusted to overcome the attenuation without using more power than necessary. For example, when peers are detected to be located relatively closer to each other upon connecting, the transmission power level could be set lower than when the peers are located relatively father from each other upon connecting.

A drawback to ranging is that once this process is completed, transmission power is effectively static. Not adjusting transmission power to account for changes in the network environment may lead to various performance deficiencies if the peers are able to move relative to one another. For example, if one peer moves closer to the other, less transmission power is required to maintain signal quality. Not reducing the transmission power level in such a situation wastes endpoint battery power. On the other hand, if the peers move farther apart, more transmission power is required to maintain signal quality. Not increasing the transmission power level in such a situation leads to signal quality degradation.

In addition, in current wireless network systems, each endpoint usually is connected to the wireless network at the maximum available transmission speed without taking into account a user's preference to connect at a lower transmission speed if the lower speed would reduce the endpoint's power consumption. Thus, the endpoint typically does not connect at a lower endpoint transmission speed even if the user would prefer doing so to conserve endpoint battery power. Not reducing endpoint transmission speed in such situations also wastes endpoint battery power.

SUMMARY OF THE INVENTION

One embodiment of a method for autonomously and dynamically optimizing transmission power of an endpoint in a wireless network includes the step of monitoring the signal quality associated with data transfers between an access point in the wireless network and the endpoint at a first transmission power and a first transmission speed. The method also includes the steps of determining whether the signal quality is acceptable and adjusting one of the first transmission power or the first transmission speed based on whether the signal quality is acceptable.

Persons skilled in the art will appreciate that the disclosed method trades off reductions in endpoint transmission speed against reductions in transmission power to maintain acceptable throughput while minimizing power consumed during operation. A wireless driver or some other functional element in the endpoint may be advantageously configured to cycle through the method steps while data traffic is flowing between the endpoint and, for example, an access point. In this fashion, the balance between endpoint transmission speed and endpoint transmission power is continually optimized, thereby decreasing the amount of endpoint battery power consumed during operation.

DETAILED DESCRIPTION OF THE INVENTION

Figure 1A:
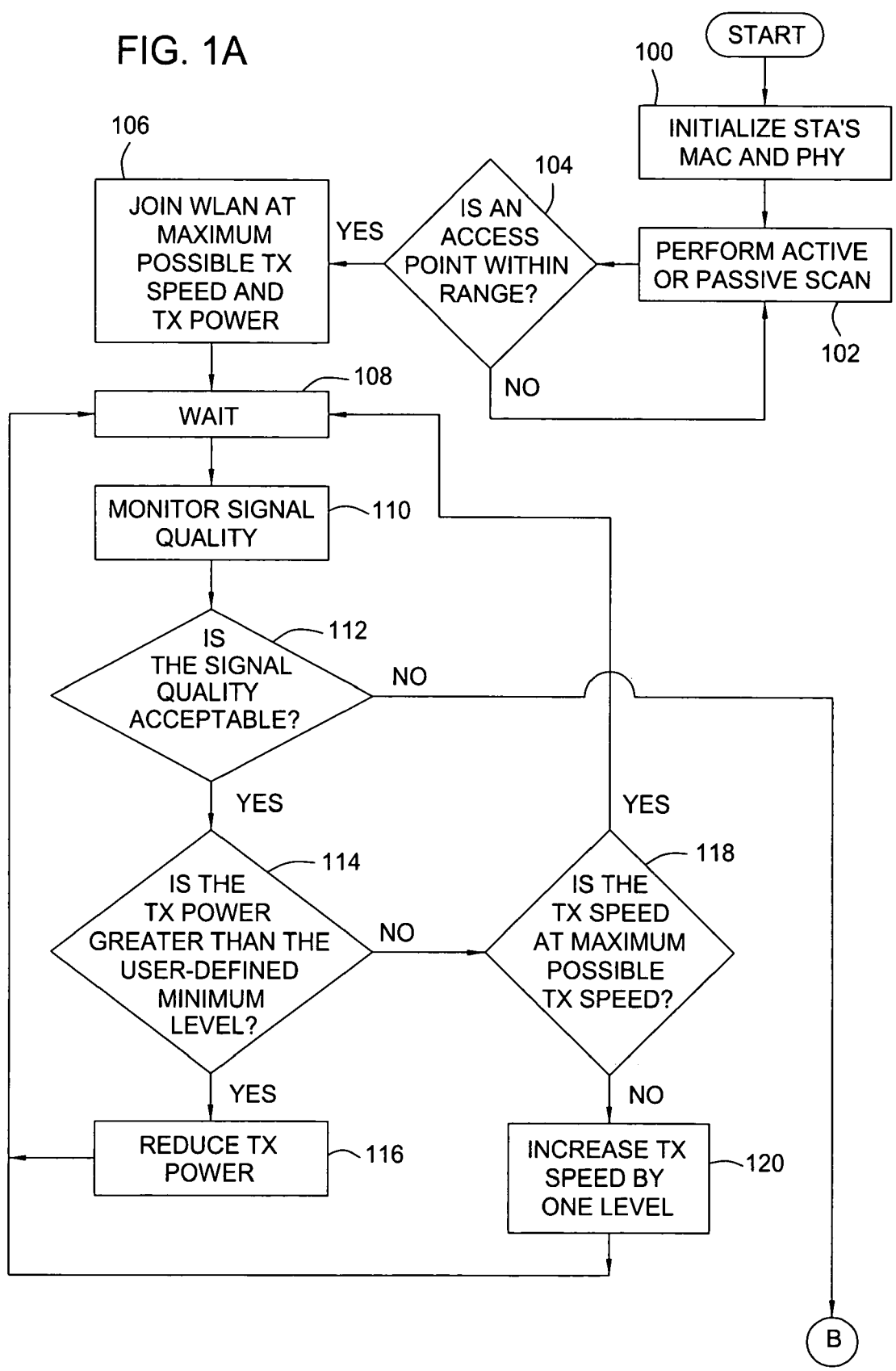
FIGS. 1A and 1B show a flow chart of method steps for autonomously and dynamically optimizing transmission power of a wireless network endpoint, according to one embodiment of the invention.
Figure 1B:
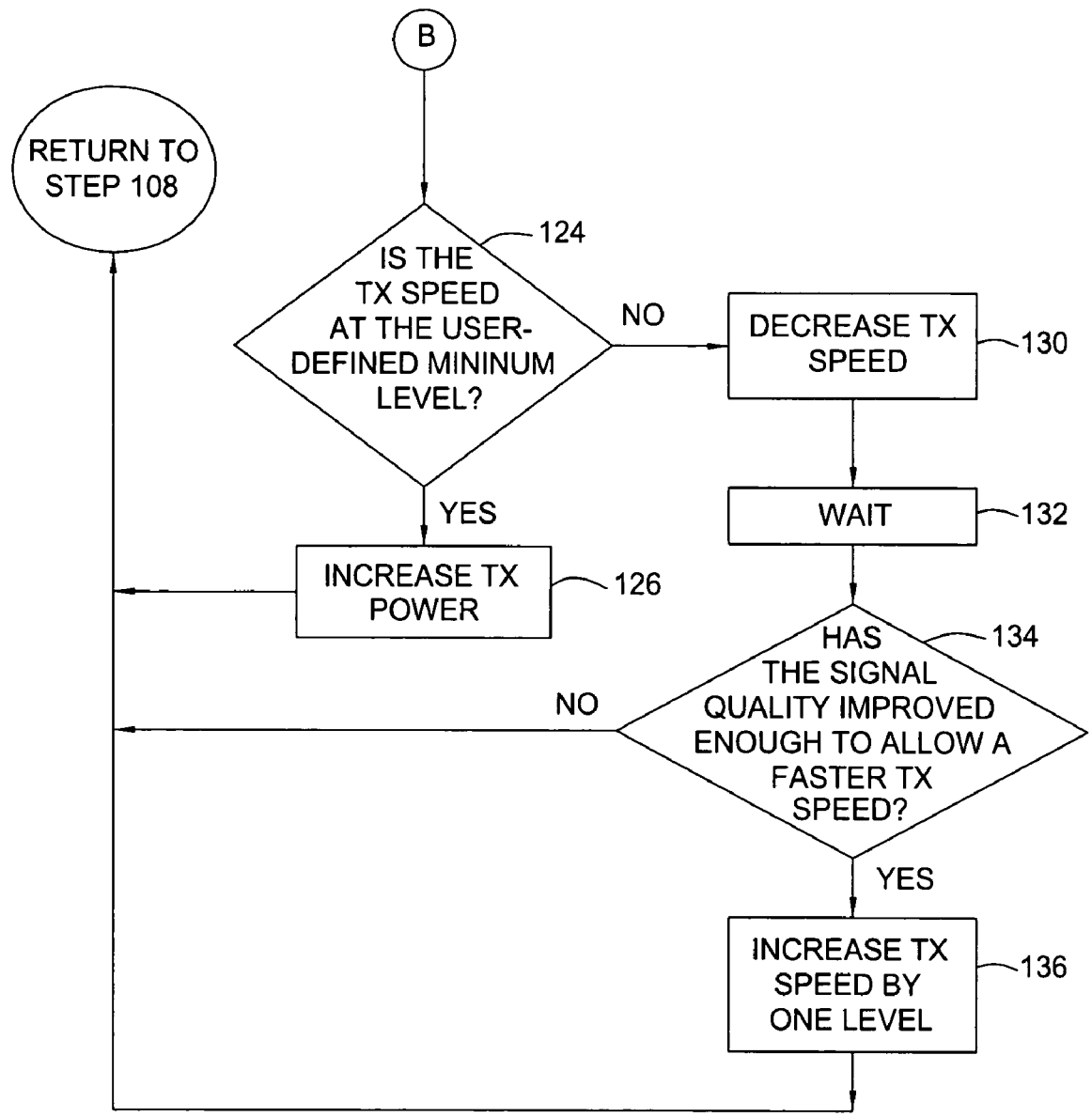

FIGS. 1A and 1B show a flow chart of method steps for autonomously and dynamically optimizing transmission power of a wireless network endpoint, according to one embodiment of the invention. Persons skilled in the art will understand that any system configured to perform the method steps in any order is within the scope of the invention.

As shown in FIGS. 1A and 1B, the method for dynamically optimizing starts in step 100 where the wireless driver performs standard initialization of the physical layer (the "PHY") and the medium access control sublayer (the "MAC") of the endpoint (the term "driver" as used herein may refer to a software driver executing in a host CPU, firmware on a microcontroller associated with or embedded within the wireless MAC, or a hardware state machine performing control functions of the MAC). In step 102, the wireless driver performs a standard search for a wireless local area network ("LAN") access point that is present and available. As is well known, the driver uses either an active scan or a passive scan for this purpose. In step 104, the wireless driver determines whether an access point is, in fact, present and available. When no access point is present and available, the method returns to step 102, and the wireless driver continues its active scan or passive scan.

If the wireless driver determines that an access point is present and available, the method proceeds to step 106 where the endpoint joins the wireless LAN at the maximum available transmission speed and transmission power for that endpoint. In an alternative embodiment, the wireless driver may be configured such that the user may select the transmission speed and/or the transmission power at which the endpoint joins the wireless LAN. Persons skilled in the art will recognize that steps 100 through 106 are standard steps for acquiring and joining a wireless LAN under the IEEE 802.11 standard.

In step 108, the wireless driver waits a certain amount of time for data transmissions between the access point and the endpoint to initiate fully and to make certain that any signal interference between the access point and the endpoint is real and sustained, as opposed to transient. In step 110, the wireless driver monitors the signal quality of the data transfers between the endpoint and the access point.

Signal quality may be monitored and analyzed using a variety of signal characteristics such as, without limitation, the transmission error rate of the signal transmitted by the endpoint, the received signal strength indication (the "RSSI") of the signal received by the endpoint, and the signal-to-noise ratio of the signal received by the endpoint. As persons skilled in the art understand, transmission errors associated with normal data traffic between the endpoint and the access point are continuously managed at the MAC. In this embodiment, the wireless driver monitors the rate of these transmission errors. As is also commonly known, the RSSI of the received signal is continuously measured at the PHY in a wireless LAN endpoint. Thus, in this embodiment, the wireless driver monitors the RSSI of the received signal measured at the PHY to determine the strength of the RSSI. Finally, as is commonly known, the signal-to-noise ratio of a given signal corresponds to the quality of that signal. Again, in this embodiment, the wireless driver monitors the signal-to-noise ratio of the received signal to determine the quality of the received signal.

In step 112, the wireless driver determines whether the signal quality of the data transfers between the endpoint and the access point is acceptable. Signal quality may be measured in a variety of ways. For example, in one embodiment, the RSSI and signal-to-noise ratio of the received signal and the transmission error rate associated with the transmitted signal may be measured and a weighted score may be computed based on the individual measurements. The computed score may then be compared to a range of scores corresponding to acceptable signal quality to determine whether the overall signal quality is in the acceptable range. In an alternative embodiment, a weighted score may be computed using any two of these three factors. In another alternative embodiment, a weighted score may be computed using one or more of these three factors in combination with one or more other signal characteristics. In yet other embodiments, any one factor, such as the transmission error rate of the transmitted signal, may be used to evaluate signal quality. For example, the wireless driver may be configured to determine whether the transmission error rate deviates from a statistically-determined historic transmission error rate for that endpoint in the existing wireless LAN environment. If the transmission error rate corresponds to the historic transmission error rate, then the signal quality is considered to be acceptable. If, however, the transmitted error rate increases beyond some threshold relative to the historic transmission error rate, then the transmission error rate is considered to be unacceptable. Since signal quality may be analyzed in numerous ways, persons skilled in the art will recognize that the way in which signal quality is analyzed in no way limits the scope of the invention.

The method proceeds to step 124 if the wireless driver determines that the signal quality between the endpoint and the access point is not acceptable. In step 124, the wireless driver determines whether the endpoint transmission speed is equal to the user-defined minimum level. More specifically, in one embodiment, when first attempting to join the wireless LAN, the user is asked to specify certain system parameters of the impending session. One such system parameter is the slowest endpoint transmission speed that the user is willing to accept. The wireless networking standard supported by the endpoint determines the universe of possible endpoint transmission speeds. For example, if the endpoint supports IEEE 802.11b, then the possible endpoint transmission speeds are 1 Mbps, 2 Mbps, 5.5 Mbps and 11 Mbps. The user designates one of these transmission speeds as the slowest acceptable endpoint transmission speed. If the user does not specify a minimum transmission speed, then a default minimum speed may be used instead.

If the endpoint transmission speed is equal to the user-defined minimum level, then the method proceeds to step 126 where the wireless driver is configured to increase the transmission power of the endpoint because, in step 112, it was established that the signal quality was not acceptable. The transmission power may be adjusted in a variety of ways. For example, in one embodiment, the transmission power is increased by a certain incremental amount, x. In an alternative embodiment, the transmission power may be increased in a more coarse fashion. For example, the wireless driver may be configured to determine what the transmission power should be using a formula that expresses transmission power as a function of one or more system parameters and then to adjust the transmission power accordingly. In one possible embodiment, the formula may state that the product of the strength of the received signal (as determined by the RSSI) and the endpoint transmission power remains constant. Thus, as the received signal strength decreases (e.g., as a result of the endpoint moving farther away from the access point), the transmission power is increased accordingly. In yet other embodiments, the endpoint transmission power may be increased through a combination of coarse and fine adjustments. For example, the transmission power first may be increased using a coarse adjustment, as described above, and then fine tuned with incremental adjustments. Again, since transmission power may be adjusted in numerous ways, the method used for increasing the transmission power in no way limits the scope of the invention. After the endpoint transmission power is increased, the method returns to step 108.

If the endpoint transmission speed is not equal to the user-defined minimum level, then the method proceeds to step 130 where the wireless driver is configured to decrease the endpoint transmission speed. In one embodiment, the endpoint transmission speed is decreased by one level increments. Again, the wireless networking standard supported by the endpoint determines what endpoint transmission speed is one level below the current endpoint transmission speed. For example, if the endpoint supports IEEE 802.11b and the current endpoint transmission speed is 5.5 Mbps, then 2 Mbps is the endpoint transmission speed one level below the current endpoint transmission speed. In other embodiments, the endpoint transmission speed by be decreased in any technically feasible way and by any amount. The modulation scheme used with a slower endpoint transmission speed typically tolerates a lower signal to noise ratio in order to transmit data successfully. Lowering the endpoint transmission speed therefore decreases the amount of endpoint transmission power required to transmit data successfully, thereby increasing signal quality at a given endpoint transmission power level.

In step 132, the wireless driver waits a certain amount of time before continuing through the method steps to allow the various elements of the wireless LAN to adjust fully to the new endpoint transmission speed.

In step 134, the wireless driver determines whether the signal quality of the data transfers between the endpoint and the access point has improved enough to allow a faster endpoint transmission speed. This step is similar to step 112 in that the wireless driver determines whether the overall signal quality is acceptable. Signal quality may be analyzed the same way or differently in steps 112 and 134. Again, as described above in conjunction with step 112, since signal quality may be analyzed in numerous ways, the way in which signal quality is analyzed in step 134 does not limit the scope of the invention.

The method proceeds to step 136 if the wireless driver determines that the signal quality has improved enough to allow a faster endpoint transmission speed. In step 136, the wireless driver increases the endpoint transmission speed by one level. The method then returns to step 108.

If, however, in step 134 the wireless driver determines that the signal quality has not improved enough to allow a faster endpoint transmission speed, then the method returns to step 108.

Returning to the description of step 112, the method proceeds to step 114 if the wireless driver determines that the signal quality of the recent data transfers between the endpoint and the access point is acceptable. In step 114, the wireless driver determines whether the endpoint transmission power is greater than the user-defined minimum level. As described above in conjunction with step 124, when first attempting to join the wireless LAN, the user is asked to specify certain system parameters of the impending session. One such system parameter is the minimum level of transmission power that the user is willing to accept. If the user does not specify a minimum level of transmission power, then a default minimum transmission power level may be used instead.

The method proceeds to step 116 if the endpoint transmission power is greater than the user-defined minimum level. In step 116, the wireless driver reduces the transmission power at the endpoint. As described above in conjunction with step 126, the transmission power may be decreased in a variety of ways, including incrementally, coarsely or through a combination of course and fine adjustments. Again, the way in which the transmission power is decreased in no way limits the scope of the invention. After the endpoint transmission power is reduced, the method returns to step 108.

If, however, in step 114 the wireless driver determines that the endpoint transmission power is not greater than the user-defined minimum level, then the method proceeds to step 118 where the wireless driver determines whether the endpoint transmission speed is at the maximum possible transmission speed. If the endpoint transmission speed is not at the maximum possible level, then the method proceeds to step 120 where the wireless driver is configured to increase the endpoint transmission speed by one level. The method then returns to step 108.

Persons skilled in the art will understand that the wireless driver is configured to cycle through the foregoing method steps continuously while data traffic is flowing between the endpoint and the access point. In this fashion, the balance between endpoint transmission speed and endpoint transmission power is continually optimized, thereby decreasing the amount of endpoint battery power consumed during operation while still permitting acceptable throughput.

Figure 2:
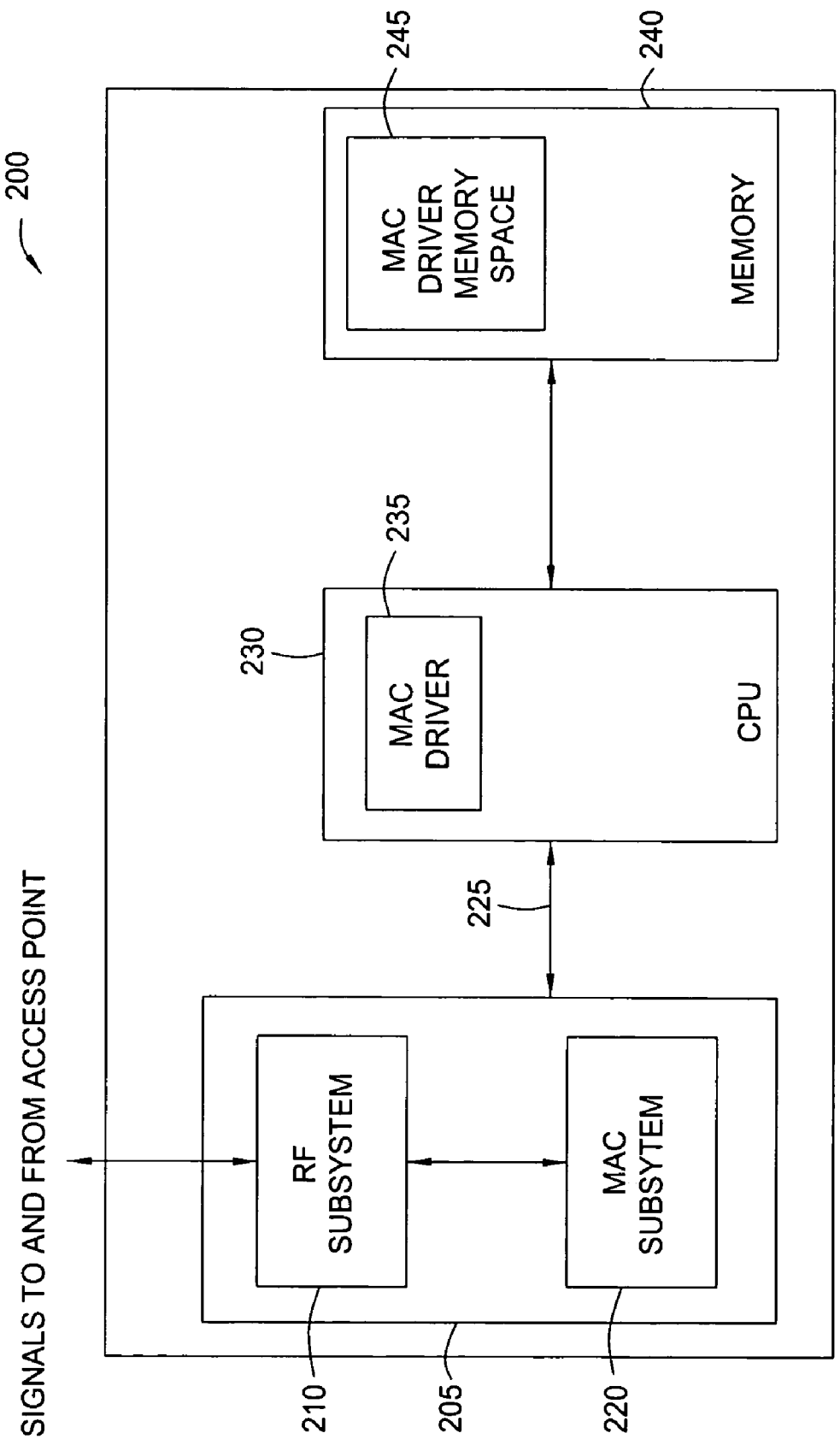
FIG. 2 is a conceptual diagram of a computing device that may be configured to implement the method steps of FIGS. 1A and 1B, according to one embodiment of the invention.

FIG. 2 is a conceptual diagram of a computing device 200 that may be configured to implement the method steps of FIGS. 1A and 1B, according to one embodiment of the invention. Computing device 200 may be any type of wireless computing device such as, for example, a laptop computer, a personal digital assistant or a cellular phone. As shown, computing device 200 includes, without limitation, a radio frequency (RF) subsystem 210, a MAC subsystem 220, a central processing unit (CPU) 230 and a memory 240. RF subsystem 210 and MAC subsystem 220 are well known in the art, specifications for which are set forth in the IEEE 802.11 standard. A MAC driver 235, which is similar to the wireless driver referenced above in conjunction with FIGS. 1A and 1B, runs on CPU 230 (and within driver memory space 245 of memory 240). CPU 230 is coupled to a networking element 205, which includes RF subsystem 210 and MAC subsystem 220, via input/output bus 225. In alternative embodiments, the optimization algorithm described herein may be implemented using a processor other than CPU 230, such as a dedicated networking processor, a graphics processor, some other type of special-purpose processor, or a hardware state machine with special-purpose logic dedicated to implementing this functionality.

RF subsystem 210 is configured to measure the RSSI and the signal-to-noise ratio associated with each frame of a signal received by computing device 200 from the access point. RF subsystem 210 is further configured to measure the transmission error rate associated with a corresponding signal transmitted from computing device 200 to the access point. In addition, RF subsystem 210 is configured to transmit these measurements as well as the received frames to MAC subsystem 220. MAC driver 235, through CPU 230, is configured to interpret these measurements at a set frequency and to determine what adjustments to the transmission power or transmission speed should be made in view of the methodology of FIGS. 1A and 1B. MAC driver 235 is further configured to instruct MAC subsystem 220 to adjust the gain for transmission power or transmission speed, as the case may be, in RF subsystem 210.

Persons skilled in the art will recognize that computing device 200 may be configured to include other elements to support additional interfaces, such as, without limitation, a PCI bus, a PCI express bus, a system management bus, a universal serial bus or any other industry standard or proprietary bus. Further, the foregoing describes only one system in which the invention may be implemented. In alternative embodiments, the invention may be implemented in any type of computing device or equivalent system containing the components necessary to implement the various functionalities described herein. Persons skilled in the art will therefore understand that the hardware environment depicted in conjunction with computing device 200 in no way limits the scope of the invention.

The invention has been described above with reference to specific embodiments. Persons skilled in the art, however, will understand that various modifications and changes may be made thereto without departing from the broader spirit and scope of the invention as set forth in the appended claims. For example, the functionality described above in conjunction with FIGS. 1A and 1B may be implemented in software and/or hardware. With respect to computing device 200 of FIG. 2, hardware and software elements other than those conforming to the IEEE 802.11 standard may be used implement the methodology of FIGS. 1A and 1B. In alternative embodiments, the strength of the beacon signal transmitted by the access point to the endpoint may be used in lieu of the strength of the RSSI of the data signal received from the access point in any of the steps included in any of the disclosed methodologies.

In addition to the foregoing, the decision to implement one of the methodologies described herein may be made in any number of ways. For example, in one embodiment, when first attempting to join the wireless LAN, the user may be prompted to select a mode that will aggressively reduce power during operation. Selecting this mode would then cause the endpoint to implement one of the disclosed methodologies. In an alternative embodiment, one of the disclosed methodologies may be implemented automatically, without any input from the user.

Finally, although FIGS. 1A and 1B refer to using the disclosed methodologies in a wireless LAN, persons skilled in the art will understand that the disclosed methodology may be used in any type of wireless or wired networking technology, given the ability to adjust the transmission power and/or the transmission speed. The foregoing description and drawings are, accordingly, to be regarded in an illustrative rather than a restrictive sense.

What is claimed is:

1. A method for optimizing transmission power and transmission speed of a first endpoint machine in a wireless network, the method comprising:
   receiving a signal at the first endpoint machine transmitted by an access point in the wireless network;
   at the first endpoint machine, measuring one or more characteristics of the received signal;
   at the first endpoint machine, computing the signal quality of the received signal based on the one or more characteristics; and
   at the first endpoint machine, determining whether the signal quality of the received signal is acceptable,
      wherein if the signal quality of the received signal is acceptable, then determining whether a transmission power of the first endpoint machine is greater than a user-defined minimum level,
         wherein if the transmission power of the first endpoint machine is greater than the user-defined minimum level, then reducing the transmission power of the first endpoint machine,
         wherein if the transmission power of the first endpoint machine is not greater than the user-defined minimum level, then determining whether a transmission speed of the first endpoint machine is at a maximum possible transmission speed,
            wherein if the transmission speed of the first endpoint machine is at a maximum possible transmission speed, then returning to the step of measuring,
            wherein if the transmission speed of the first endpoint machine is not at the maximum possible transmission speed, then increasing the transmission speed of the first endpoint machine by one level,
      wherein if the signal quality of the received signal is not acceptable, then determining whether the transmission speed of the first endpoint machine is at a user-defined minimum level,
         wherein if the transmission speed of the first endpoint machine is at the user-defined minimum level, then increasing the transmission power of the first endpoint machine,
         wherein if the transmission speed of the first endpoint machine is not at the user-defined minimum level, then:
            decreasing the transmission speed of the first endpoint machine by one level, and
            determining whether the signal quality of the received signal is improved enough to allow for a faster transmission speed of the first endpoint machine,
               wherein if the signal quality of the received signal is improved enough to allow for the faster transmission speed of the first endpoint machine, then increasing the transmission speed of the first endpoint machine by one level,
               wherein if the signal quality of the received signal is not improved enough to allow for the faster transmission speed of the first endpoint machine, then returning to the step of measuring.

2. The method of claim 1, wherein reducing the transmission power of the first endpoint machine comprises reducing the transmission power from a first level to a second level.

3. The method of claim 2, wherein reducing the transmission power of the first endpoint machine includes adjusting the transmission power of the first endpoint machine by a fixed increment.

4. The method of claim 2, wherein reducing the transmission power of the first endpoint machine includes adjusting the transmission power of the first endpoint machine based on a Received Signal Strength Indication (RSSI).

5. The method of claim 1, wherein increasing the transmission speed of the first endpoint machine by one level comprises increasing the transmission speed from a first level to a second level.

6. The method of claim 1, wherein the step of determining whether the signal quality is acceptable includes computing a weighted score based on a Received Signal Strength Indication (RSSI) and a signal-to-noise ratio of the signal received by the first endpoint machine.

7. A computer-readable medium storing instructions that, when executed, cause a first endpoint machine in a wireless network to optimize transmission power and transmission speed, by performing the steps of:
   receiving a signal at the first endpoint machine transmitted by an access point in the wireless network;
   at the first endpoint machine, measuring one or more characteristics of the received signal;
   at the first endpoint machine, computing the signal quality of the received signal based on the one or more characteristics; and
   at the first endpoint machine, determining whether the signal quality of the received signal is acceptable,
      wherein if the signal quality of the received signal is acceptable, then determining whether a transmission power of the first endpoint machine is greater than a user-defined minimum level,
         wherein if the transmission power of the first endpoint machine is greater than the user-defined minimum level, then reducing the transmission power of the first endpoint machine,
         wherein if the transmission power of the first endpoint machine is not greater than the user-defined minimum level, then determining whether a transmission speed of the first endpoint machine is at a maximum possible transmission speed,
            wherein if the transmission speed of the first endpoint machine is at a maximum possible transmission speed, then returning to the step of measuring,
            wherein if the transmission speed of the first endpoint machine is not at the maximum possible transmission speed, then increasing the transmission speed of the first endpoint machine by one level,
      wherein if the signal quality of the received signal is not acceptable, then determining whether the transmission speed of the first endpoint machine is at a user-defined minimum level,
         wherein if the transmission speed of the first endpoint machine is at the user-defined minimum level, then increasing the transmission power of the first endpoint machine, wherein if the transmission speed of the first endpoint machine is not at the user-defined minimum level, then:
  decreasing the transmission speed of the first endpoint machine by one level, and
  determining whether the signal quality of the received signal is improved enough to allow for a faster transmission speed of the first endpoint machine,
    wherein if the signal quality of the received signal is improved enough to allow for the faster transmission speed of the first endpoint machine, then increasing the transmission speed of the first endpoint machine by one level,
    wherein if the signal quality of the received signal is not improved enough to allow for the faster transmission speed of the first endpoint machine, then returning to the step of measuring.

8. The computer-readable medium of claim 7, wherein reducing the transmission power of the first endpoint machine comprises reducing the transmission power from a first level to a second level.

9. The computer-readable medium of claim 8, wherein reducing the transmission power of the first endpoint machine includes adjusting the transmission power of the first endpoint machine by a fixed increment.

10. The computer-readable medium of claim 8, wherein reducing the transmission power of the first endpoint machine includes adjusting the transmission power of the first endpoint machine based on a Received Signal Strength Indication (RSSI).

11. The computer-readable medium of claim 7, wherein increasing the transmission speed of the first endpoint machine by one level comprises increasing the transmission speed from a first level to a second level.

12. The computer-readable medium of claim 7, wherein the step of determining whether the signal quality is acceptable includes computing a weighted score based on a Received Signal Strength Indication (RSSI) and a signal-to-noise ratio of the signal received by the first endpoint machine.

13. A system for optimizing transmission power and transmission speed of a first endpoint machine in a wireless network, the system comprising:
  a processor; and
  a memory storing instructions that, when executed by the processor, cause the system to perform the steps of:
    receiving a signal at the first endpoint machine transmitted by an access point in the wireless network,
    at the first endpoint machine, measuring one or more characteristics of the received signal,
    at the first endpoint machine, computing the signal quality of the received signal based on the one or more characteristics, and
    at the first endpoint machine, determining whether the signal quality of the received signal is acceptable,
      wherein if the signal quality of the received signal is acceptable, then determining whether a transmission power of the first endpoint machine is greater than a user-defined minimum level,
      wherein if the transmission power of the first endpoint machine is greater than the user-defined minimum level, then reducing the transmission power of the first endpoint machine,
      wherein if the transmission power of the first endpoint machine is not greater than the user-defined minimum level, then determining whether a transmission speed of the first endpoint machine is at a maximum possible transmission speed,
      wherein if the transmission speed of the first endpoint machine is at a maximum possible transmission speed, then returning to the step of measuring,
      wherein if the transmission speed of the first endpoint machine is not at the maximum possible transmission speed, then increasing the transmission speed of the first endpoint machine by one level,
      wherein if the signal quality of the received signal is not acceptable, then determining whether the transmission speed of the first endpoint machine is at a user-defined minimum level,
      wherein if the transmission speed of the first endpoint machine is at the user-defined minimum level, then increasing the transmission power of the first endpoint machine,
      wherein if the transmission speed of the first endpoint machine is not at the user-defined minimum level, then:
        decreasing the transmission speed of the first endpoint machine by one level, and
        determining whether the signal quality of the received signal is improved enough to allow for a faster transmission speed of the first endpoint machine,
      wherein if the signal quality of the received signal is improved enough to allow for the faster transmission speed of the first endpoint machine, then increasing the transmission speed of the first endpoint machine by one level,
      wherein if the signal quality of the received signal is not improved enough to allow for the faster transmission speed of the first endpoint machine, then returning to the step of measuring.

14. The system of claim 13, wherein reducing the transmission power of the first endpoint machine comprises reducing the transmission power from a first level to a second level.

15. The system of claim 14, wherein reducing the transmission power of the first endpoint machine includes adjusting the transmission power of the first endpoint machine by a fixed increment.

16. The system of claim 14, wherein reducing the transmission power of the first endpoint machine includes adjusting the transmission power of the first endpoint machine based on a Received Signal Strength Indication (RSSI).

17. The system of claim 13, wherein increasing the transmission speed of the first endpoint machine by one level comprises increasing the transmission speed from a first level to a second level.

18. The system of claim 13, wherein the step of determining whether the signal quality is acceptable includes computing a weighted score based on a Received Signal Strength Indication (RSSI) and a signal-to-noise ratio of the signal received by the first endpoint machine.

* * * * *